United States Patent
Howard (10) Patent No.: US 10,829,332 B2
(45) Date of Patent: Nov. 10, 2020

(54) SPECIMEN CLEARING APPARATUS

(71) Applicant: Illinois Tool Works Inc., Glenview, IL (US)

(72) Inventor: Griffin Thomas Howard, Plymouth, MA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 183 days.

(21) Appl. No.: 16/197,451

(22) Filed: Nov. 21, 2018

(65) Prior Publication Data

US 2020/0156893 A1    May 21, 2020

(51) Int. Cl.
*B65H 29/12* (2006.01)
*G01N 3/08* (2006.01)

(52) U.S. Cl.
CPC ............ *B65H 29/12* (2013.01); *G01N 3/08* (2013.01); *B65H 2701/193* (2013.01); *G01N 2203/0282* (2013.01); *G01N 2203/0447* (2013.01)

(58) Field of Classification Search
CPC .......... G01N 21/6452; G01N 35/0092; G01N 35/04; G01N 35/00029; G01N 2203/0282; G01N 2203/0447; G01N 3/08; B65H 29/12; B65H 2701/193
USPC .......................................................... 73/788
See application file for complete search history.

(56) References Cited

U.S. PATENT DOCUMENTS

| | | | |
|---|---|---|---|
| 3,031,886 A * | 5/1962 | Larsson | G01N 3/34 73/812 |
| 4,606,230 A | 8/1986 | Scott et al. | |
| 5,437,192 A | 8/1995 | Kawamoto et al. | |
| 5,992,248 A * | 11/1999 | Gottfert | G01N 3/08 425/324.1 |
| 6,612,189 B1 | 9/2003 | Miyauchi | |
| 7,275,636 B2 * | 10/2007 | Luke | B65H 5/062 198/624 |
| 8,151,650 B2 * | 4/2012 | Jeppesen | G05B 11/42 73/856 |
| 8,225,638 B1 * | 7/2012 | Ardiff | G01N 3/08 73/7 |

FOREIGN PATENT DOCUMENTS

JP    H07120359    5/1995

OTHER PUBLICATIONS

International Search report issued in PCT/US2019/052625 dated Dec. 11, 2019.

* cited by examiner

*Primary Examiner* — Octavia Hollington
(74) *Attorney, Agent, or Firm* — McCarter & English, LLP

(57) ABSTRACT

The device automatically clears high elongation test samples with long tails after breakage from a materials testing device after the testing has been performed. A robotic arm engages the tested specimen and brings it to a specimen clearing device which includes a slot leading to a nip between an opposed drive wheel and driven wheel. A motor drives the drive wheel to move the tested specimen through the specimen clearing device into a scrap bin or similar repository.

10 Claims, 8 Drawing Sheets

SPECIMEN CLEARING APPARATUS

FIELD OF THE DISCLOSURE

The present disclosure relates to a device which automatically clears high-elongation test samples with long tails after breakage from a materials testing device after the testing has been performed.

DESCRIPTION OF THE PRIOR ART

While testing high elongation specimens in automation systems in a materials testing environment (including, but not limited to, applying axial forces or stress to the sample to induce strain), the tested specimens must be removed from the frame and disposed into a waste bin using a robot manipulator. This step in the automated testing process makes room for the next specimen to be tested, and clears the area of the tested specimen. When the tested specimens have long curved tails, the tails can interfere with the operation of the system if they are not properly placed in the waste bin. A traditional scrap shoot design uses gravity to slide the tested specimen down into a waste bin. Using the traditional scrap shoot design, the length of the tail of a high elongation specimen can cause the scrap shoot to work unreliably. The specimens can hang-up if any part of the specimen overhangs the shoot or rests on other parts of the testing system.

OBJECTS AND SUMMARY OF THE DISCLOSURE

It is therefore an object of the present disclosure to provide improvements in the apparatus and method for reliably and consistently removing tested specimens in a materials testing environment after the materials testing has been performed on the specimens.

This and other objects are attained by the embodiments of the present disclosure by providing a robotic or automated apparatus, thereby further providing an active and controlled way of guiding the waste specimen into the waste bin in an automated materials testing system.

A typical clearing procedure using an embodiment of the disclosure is as follows:

1. When the test has concluded, the specimen is broken in a variable location between the jaw faces of either grip (clamp) and takes a curved shape.
2. The specimen remains held by the automated grips.
3. The robot manipulator (fingers) grabs the tested specimen by the tab near the jaw face of the grip.
4. The grip opens to release the tested specimen.
5. The robot manipulator then moves away from the testing workspace carrying the tested specimen with it.
6. The robot manipulator moves to the waste clearing area and orients the tested specimen so the tab is directed into the specimen clearing device.
7. The robot manipulator inserts the tab into the spring-loaded rollers of the specimen clearing device.
8. The robot manipulator releases the tested specimen.
9. The roller motor rotates to neatly guide the tested specimen down into the waste bin.

In summary, the tested specimen is actively guided into a waste bin, ensuring that the rest of the system is cleared of the waste specimen. In addition, often in automated destructive testing systems that the longest reach requirement Tor the robot manipulator is the reach required to scrap the broken specimen. In the case where specimens have long tails after breaking, the disclosed apparatus reduces the robot manipulator reach requirement, possibly reducing robot cost. Where lab space is at a premium, this apparatus can also save space by reducing the footprint of the automation system.

BRIEF DESCRIPTION OF THE DRAWINGS

Further objects and advantages of the disclosure will become apparent from the following description and from the accompanying drawings, wherein.

DETAILED DESCRIPTION OF THE PREFERRED EMBODIMENTS

Figure 1A:
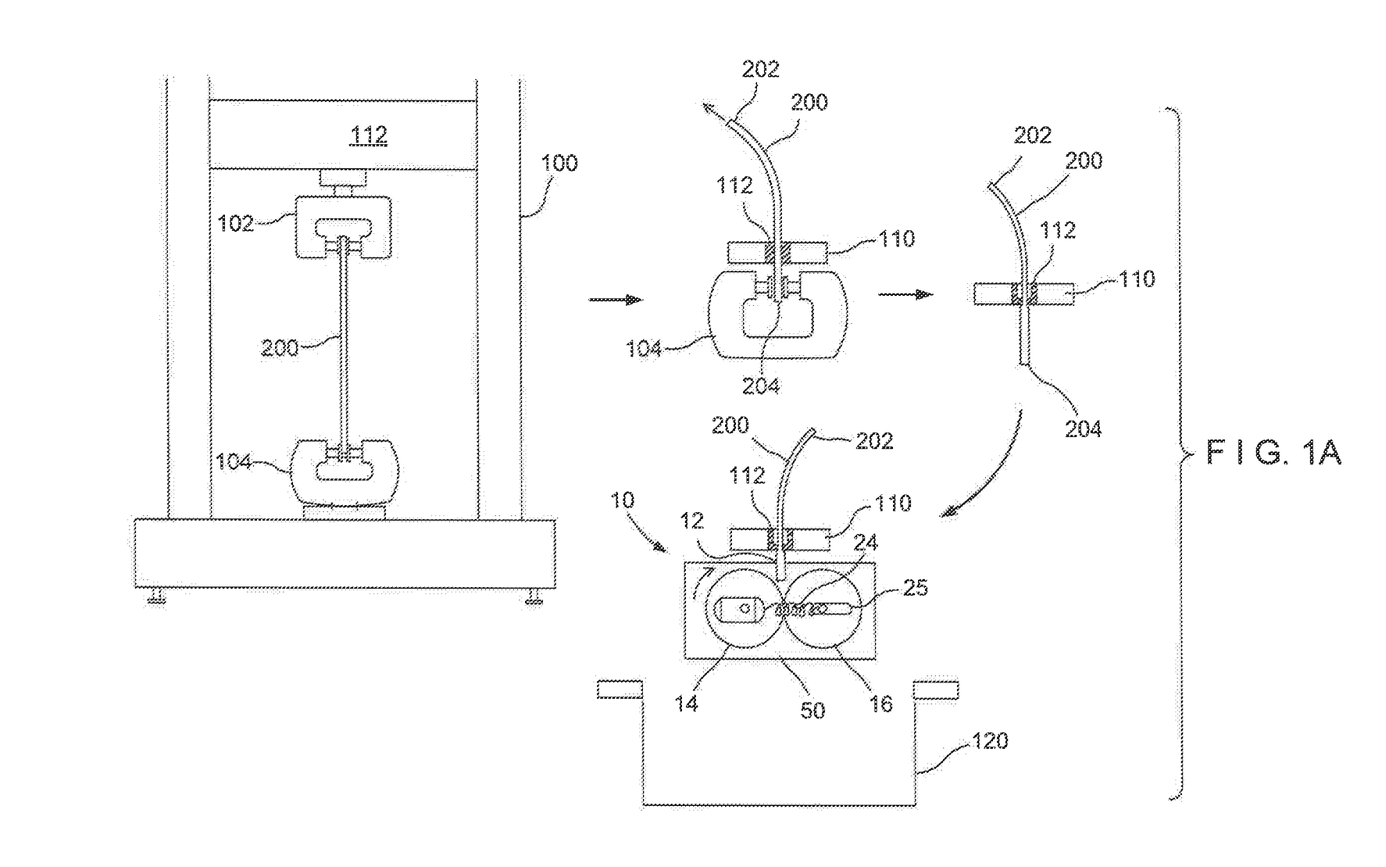
FIG. 1A illustrates the sequential workflow of an embodiment of the present disclosure.
Figure 1B:
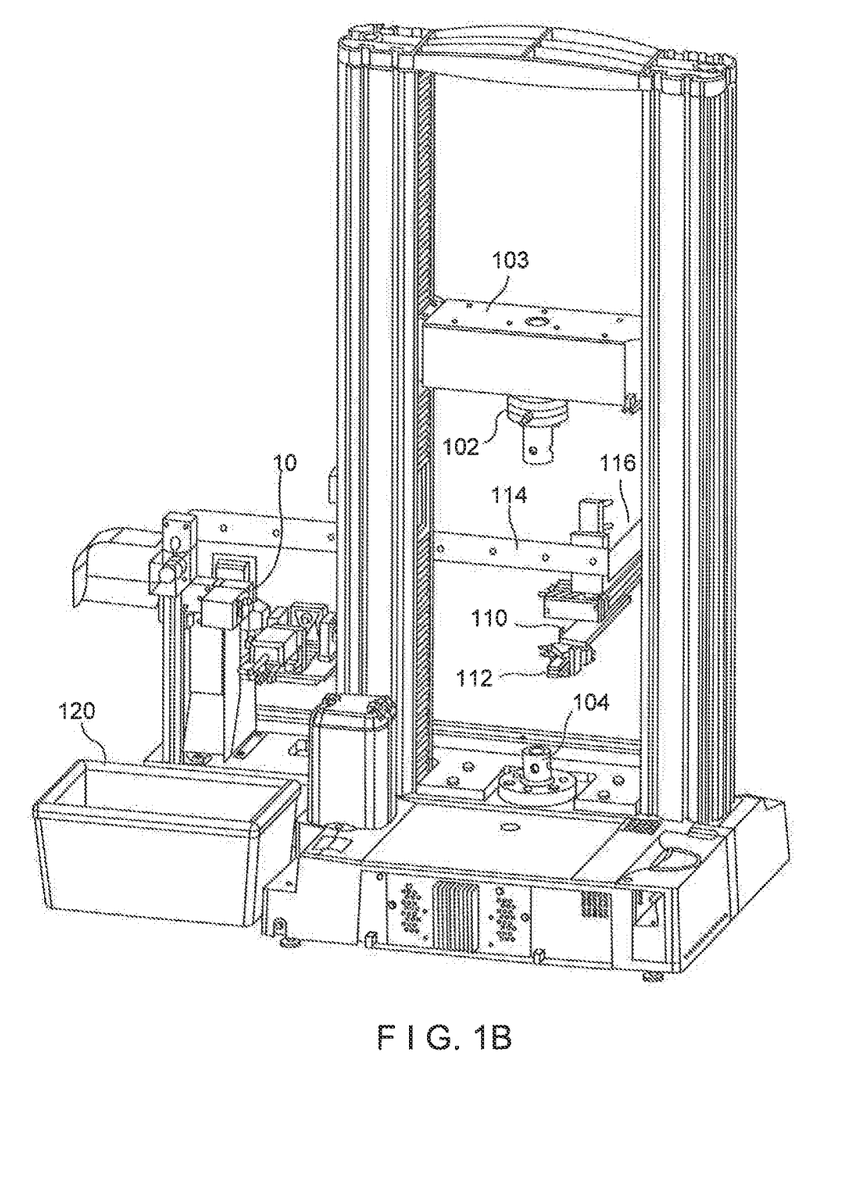
FIG. 1B is a first perspective view of an embodiment of the present disclosure.
Figure 1C:
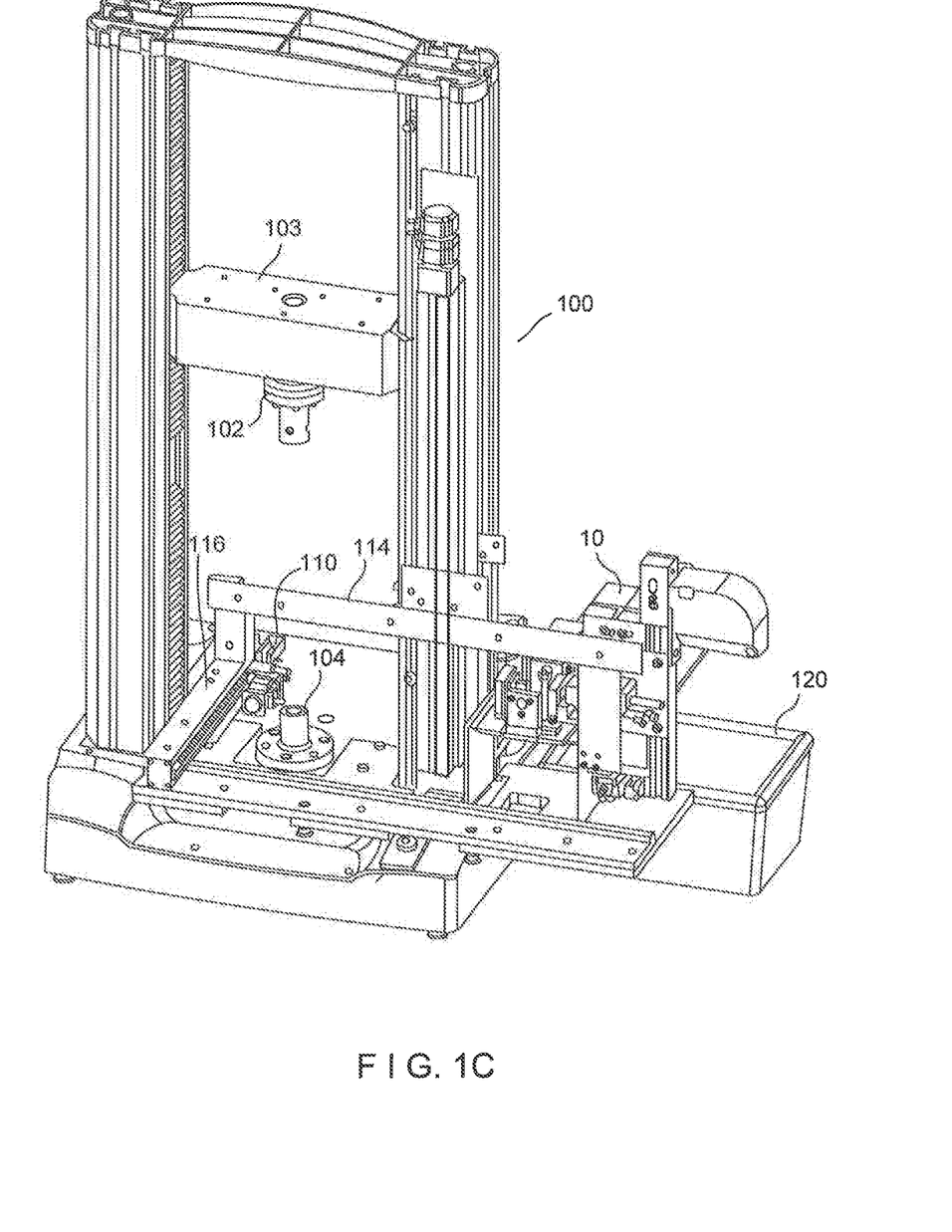
FIG. 1C is a second perspective view of an embodiment of the present disclosure.
Figure 2:
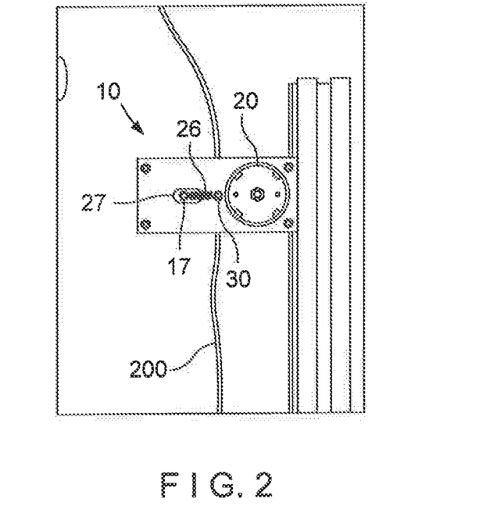
FIG. 2 is a plan view of an embodiment of present disclosure, illustrated with an inserted specimen.

Referring now to the drawings in detail wherein like numerals refer to like elements throughout the several views, one sees that the materials testing system employing the embodiment of the present disclosure is illustrated in FIGS. 1A-1C. Frame 100 of materials testing device, or universal tester, includes crosshead 103 and upper and lower jaws 102, 104 for engaging a materials testing specimen 200 and typically applying an axial or longitudinal force thereto, thereby inducing strain, with measurements of stress and strain being generated. These measurements and calculations may further include the modulus of elasticity and the maximum load or stress before failure, such as breakage or inelastic deformation.

After the materials test is performed, it is desired to remove the tested specimen 200, particularly in the environment of using automated testing for a sequence of testing specimens. The robotic arm 110, including an engaging slot 112 (which may be implemented as a gripper) is positioned on computer-controlled positioning arms 114, 116. In order to remove the tested specimen 200, the robotic arm 110 is brought into position by positioning arms 114, 116 so as to place the tested specimen 200 within the engaging slot 112, typically immediately above the lower jaw 104. The tail 202 of the tested specimen 200 may be above the robotic arm 110 while the tab 204 (previously engaged by lower jaw 104) may be below the robotic arm 110.

The robotic arm 110 then is positioned to place the tab 204 of the tested specimen 200 within the specimen clearing apparatus 10. More specifically, the tab 204 is inserted through upper slot 12 of specimen clearing apparatus 10 to be engaged between drive wheel 14 and driven wheel 16, opposed and biased toward each other by front and rear springs 24, 26 (see FIGS. 2-7). The motor 20 rotationally drives the drive wheel 14 so that drive wheel 14 and driven wheel 16 counter-rotate and urge the tested specimen 200 into the scrap bin 120 (or similar repository).

In more detail, as shown in FIGS. 2, 3A and 4-7, the specimen clearing apparatus 10 uses the drive wheel 14 and the driven wheel 16 to grasp the tested specimen 200 which is inserted through upper slot 12, which includes chamfered walls 13 to allow aid in the location of the tested specimen 200 by the robot manipulator 110. The drive wheel 14 and driven wheel 16 are journaled for rotation within a housing 36 with upper slot 12 along the top. This provides enough space for the tested specimens to be placed into the nip 19 between wheels 14, 16, but is small enough to keep fingers out to protect users from the potential pinch hazard of the nip 19 between the wheels 14, 16.

The drive wheel 14 has a fixed position axle 15, and is driven by electric motor 20. The driven wheel 16 is mounted on a floating axle 17, which is allowed to move away from the drive wheel 14 as floating axle 17 extends through front and rear slots 25, 27 of the housing 36 and is attached to front and rear springs 24, 26 (which are, in turn, secured to respective front and rear posts 28, 30 on front and rear panels 32, 34 of housing 36) which pull the drive wheel 14 and driven wheel 16 together to provide a normal force between them. This compliance allows the specimen clearing apparatus 10 to adjust to variations in the thickness of the tested specimen 200. This further provides adequate friction between the drive wheel 14, the driven wheel 16 and the tested specimen 200 to firmly grip the sides of the tested specimen 200 and pull it through the specimen clearing apparatus 10.

Figure 3A:
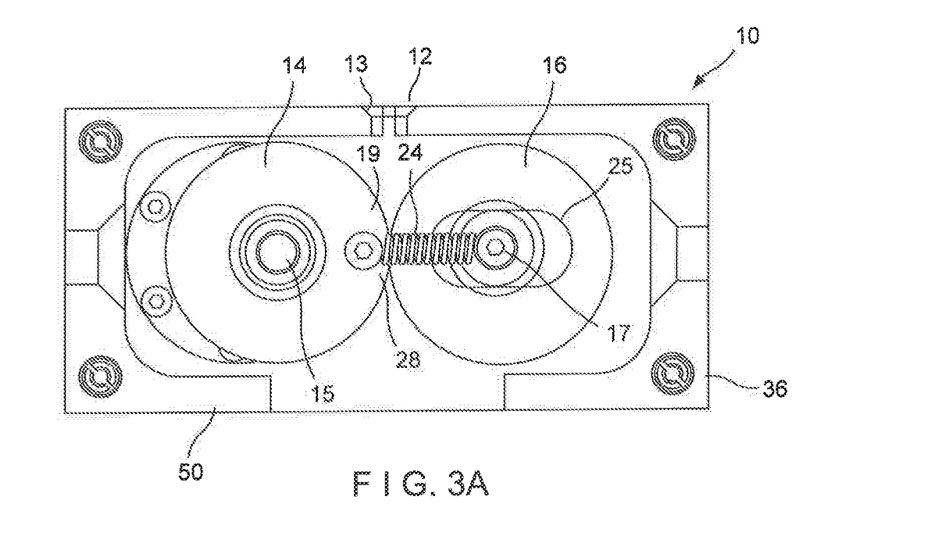
FIG. 3A is a plan view, partially in phantom, illustrating interior components of an embodiment of the present disclosure.
Figure 3B:
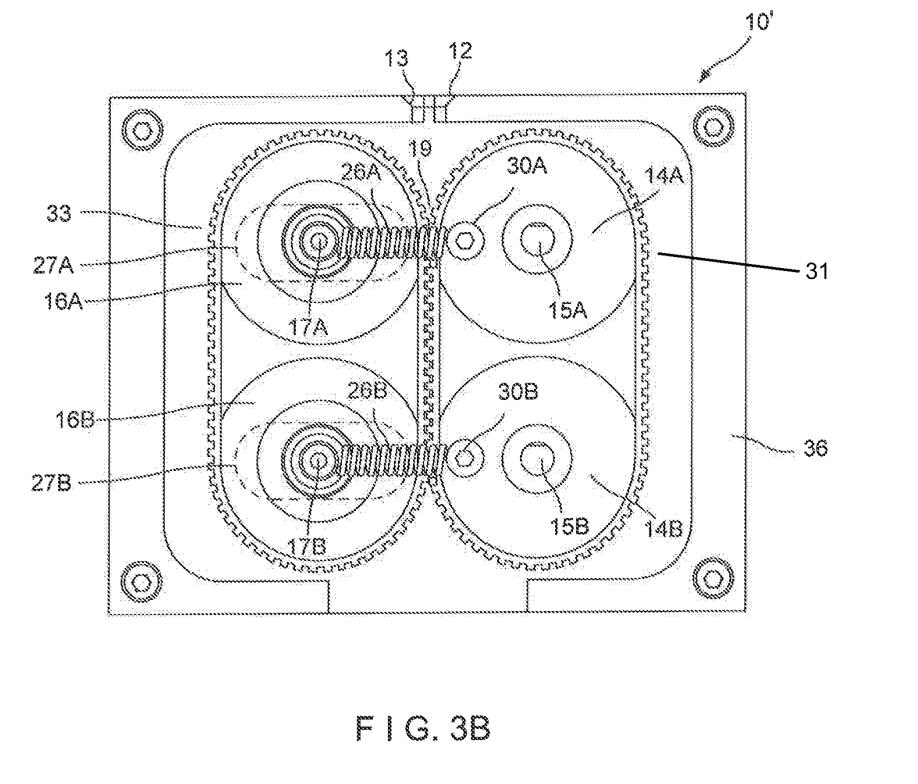
FIG. 3B is a plan view, partially in phantom, illustrating interior components of a first alternative embodiment of the present disclosure.
Figure 3C:
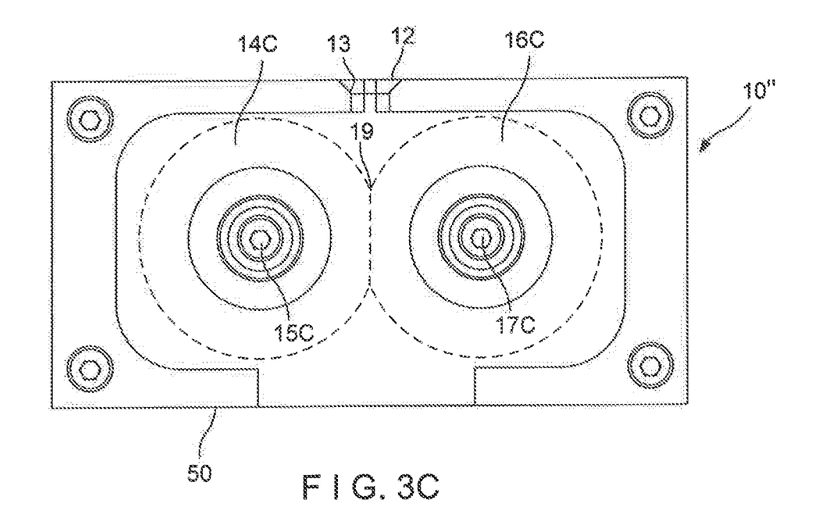
FIG. 3C is a plan view, partially in phantom, illustrating interior components of a second alternative embodiment of the present disclosure.
Figure 3D:
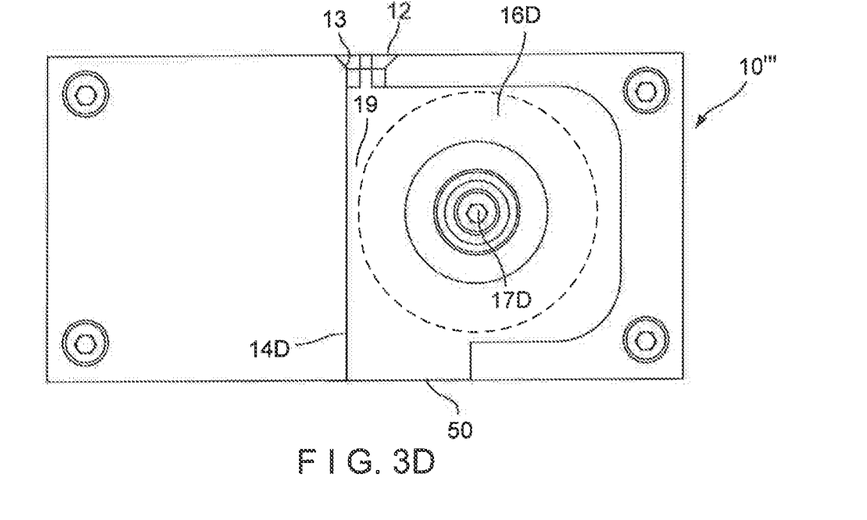
FIG. 3D is a plan view, partially in phantom, illustrating interior components of a second alternative embodiment of the present disclosure.
Figure 4:
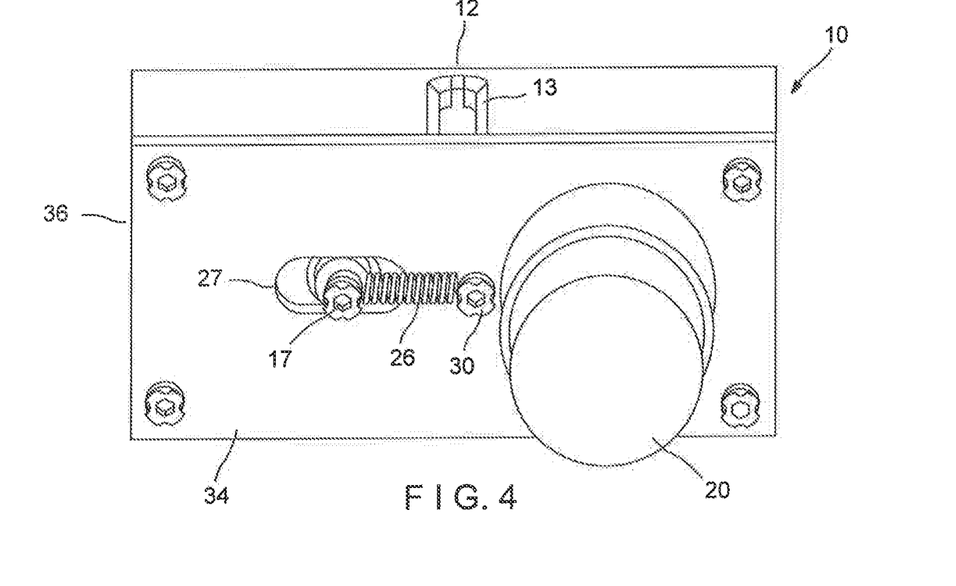
FIG. 4 is a perspective front view, illustrating an embodiment of the present disclosure.
Figure 5:
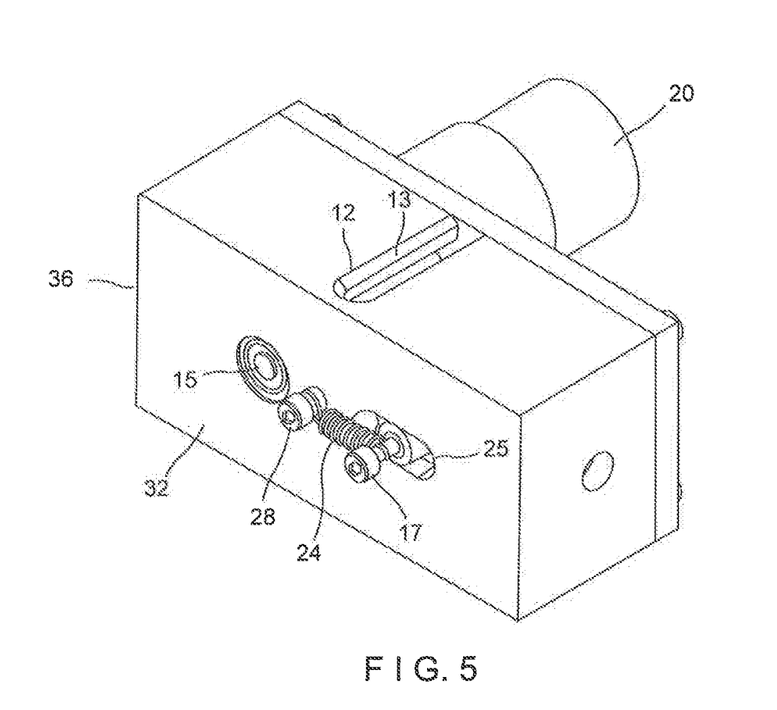
FIG. 5 is a perspective front view, illustrating an embodiment of the present disclosure.
Figure 6:
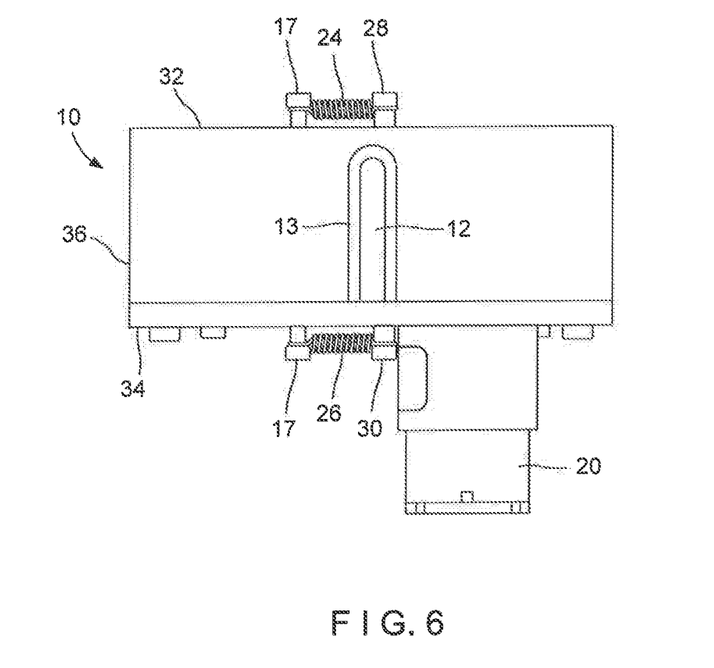
FIG. 6 is a top plan view, illustrating an embodiment of the present disclosure.
Figure 7:
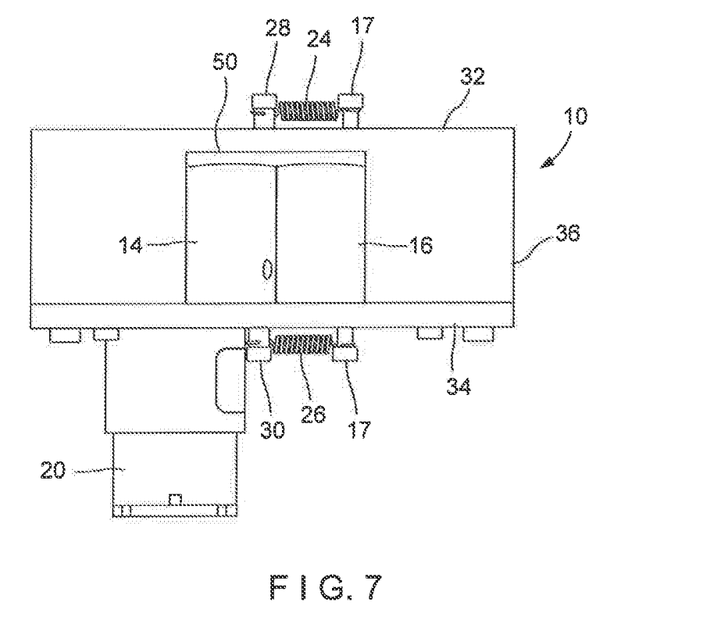
FIG. 7 is a bottom plan view, illustrating an embodiment of the present disclosure.

FIGS. 3B, 3C and 3D illustrate first, second and third alternative embodiments of the specimen clearing device 10. FIG. 3B illustrates the first alternative embodiment of specimen clearing device 10' wherein nip 19 is provided between first and second belts 31, 33, which may present a tread-like texture. First belt 31 traverses first pair of wheels 14A, 14B (one or both of which may be externally driven) journaled for rotation about respective fixed axles 15A, 15B while second belt 33 traverses a second pair of wheels 16A, 16B which are journaled for rotation about respective first and second floating axles 17A, 17B. Floating axles 17A, 17B travel respective within slots 27A, 27B and are biased toward respective fixed axles 15A, 15B by respective springs 26A, 26B (with similar slots and springs on the other side of floating axles 17A, 17B) which are secured by respective posts 30A, 30B in a configuration similar to that disclosed in FIGS. 3A and 4-7.

FIG. 3C illustrates a second alternative embodiment of specimen clearing device 10" wherein nip 19 is provided between first and second compliant wheels 14C, 16C, which are journaled for rotation about respective fixed axles 15C, 17C. The first and second compliant wheels 14C, 16C urge against each other whereby the compliance or elasticity of the wheels 14C, 16C provides for the engaging of tested specimens 200 of varying thicknesses.

FIG. 3D illustrates a third alternative embodiment of specimen clearing device 10''' wherein a nip 19 is formed between driven wheel 16D and stationary vertical wall 14D. Wheel 16D is journaled for rotation about axis 17D. Axis 17D could be a fixed axis (wherein wheel 16D would typically be compliant) or a floating axis. Wheel 16D could be replaced by another single moving engaging surface such as a rotating belt. Vertical wall 14D is a stationary surface with a sufficient low coefficient of friction to allow rotating wheel 16D (or other single moving engaging surface) to transport the tested specimen.

To use this system, a specimen 200 is tested in a universal tester 100, where it is stretched between the upper and lower grips 102, 104 (see FIG. 1A), The specimen 200 may, or may not be broken during testing. When the test is complete, the robot manipulator 110 grabs or engages the tested specimen 200. If the tested specimen 200 is broken, the robot manipulator 110 clears one half at a time, and if the specimen is not broken, it clears the tested specimen 200 in one maneuver.

Figure 8:
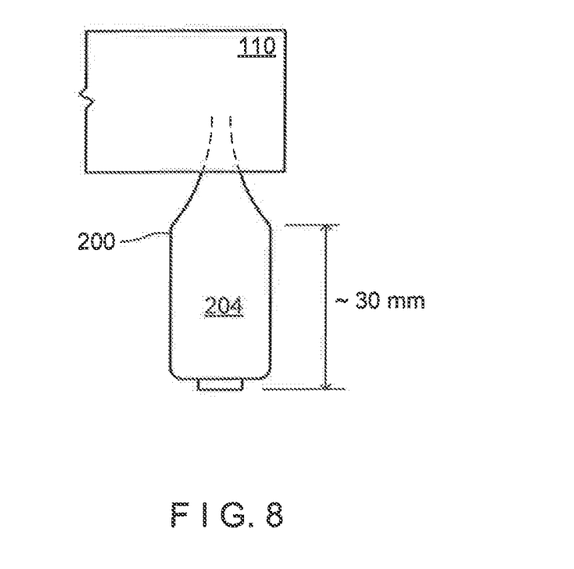
FIG. 8 is a schematic of a robot manipulator engaging the tab of a tested specimen in an embodiment of the present disclosure.

The robot manipulator 110 is typically positioned in three dimensions (e.g., horizontally and vertically with respect to the frame 100 of materials testing device of FIGS. 1A-1C, as well as perpendicularly to the illustrated figure, typically travelling in orthogonal directions) by computer-controlled positioning arms 114, 116 and grabs or engages the tested specimen 200 just above (for the lower grip 104) or below (for the upper grip 102) where it is clamped in the grip 102 or 104. As shown in FIG. 8, this typically leaves a tab 204 that is 25-30 millimeters long. The tested specimen 200 is then moved in three dimensions, typically in orthogonal directions, to the specimen clearing apparatus 10. A typical sequence may be to:

1. insert the robot manipulator 110 horizontally into the frame 100 to engage the tested specimen 200 (i.e., perpendicular to the illustration of FIG. 1A), the grips 102, 104 release the tested specimen 200;

2. retract the robot manipulator 110 horizontally away from the frame 100 (i.e., again, perpendicular to the illustration of FIG. 1A) with the tested specimen 200 engaged thereto;

3. raise the robot manipulator 110 vertically;

4. reposition the robot manipulator horizontally (i.e., parallel to the illustration of FIG. 1A);

5. reposition the robot manipulator 110 again horizontally (i.e., perpendicular to the illustration of FIG. 1A, orthogonal to the movement of step 4) over the specimen clearing apparatus 10; and 6. then finally vertically lower the robot manipulator 110 to insert the tab 204 into the slot 12 of specimen clearing apparatus 10.

The motor 20 is turned on, and the tab 204 is inserted into the upper slot 12. When the tested specimen 200 is pushed into the nip 19 between the wheels (or rollers) 14, 16, the wheels 14, 16 drag the tested specimen 200 through the specimen clearing apparatus 10. Once the tab 204 is pulled by the specimen clearing apparatus 10, the robot manipulator 110 releases the tested specimen 200 and the tested specimen 200 is driven or ejected through the lower opening 50 (see FIG. 7) of specimen clearing apparatus 10 and dropped into the scrap bin 120 below.

Thus the several aforementioned objects and advantages are most effectively attained. Although preferred embodiments of the invention have been disclosed and described in detail herein, it should be understood that this invention is in no sense limited thereby.

What is claimed is:

1. A method for clearing tested samples from a materials testing machine, including the steps of:
providing an engaging device for engaging materials testing samples in a materials testing machine and transferring the materials testing samples to a sample clearing device, wherein the sample clearing device includes:
first and second engaging surfaces for engaging the testing sample, wherein the first and second engaging surfaces are respectively a first opposed wheel on a fixed axle and a second opposed wheel on a floating axle biased toward the fixed axle, wherein the floating axle has a first end and a second end, and wherein a nip is formed between the first and second opposed wheels;
a driver for at least one of the first and second opposed wheels, thereby activating at least one of the first and second opposed wheels and transporting the materials testing sample; and
a housing including an upper opening for receiving the testing sample, a lower opening through which the testing sample is ejected, and first and second side slots through which respective first and second ends of the floating axle extend.

2. The method of claim 1 further including the steps of:
providing a materials testing machine; and
performing tests on materials testing samples by the materials testing machine.

3. The method of claim 1 wherein the the first end of the floating axle is biased by a first spring and the second end of the floating axle is biased by a second spring.

4. The method of claim 3 wherein the first and second springs each have a first end secured to the floating axle and a second end secured to an exterior of the housing.

5. A sample clearing device including:
first and second engaging surfaces for engaging a materials testing sample, wherein the first and second engaging surfaces are respectively a first opposed wheel on a fixed axle and a second opposed wheel on a floating axle biased toward the fixed axle, wherein the floating axle has a first end and a second end, and wherein a nip is formed between the first and second opposed wheels;
a driver for at least one of the first and second opposed wheels, thereby activating at least one of the first and second opposed wheels and transporting the materials testing sample; and
a housing including an upper opening for receiving the testing sample, a lower opening through which the testing sample is ejected, and first and second side slots through which respective first and second ends of the floating axle extend.

6. The sample clearing device of claim 5 wherein the first end being of the floating axle is biased by a first spring and the second end of the floating axle is biased by a second spring.

7. The sample clearing device of claim 6 wherein the first and second springs each have a first end secured to the floating axle and a second end secured to an exterior of the housing.

8. A system including:
a materials testing machine for performing tests on testing samples;
a sample clearing device;
wherein the sample clearing device includes:
first and second engaging surfaces for engaging the testing sample, wherein the first and second engaging surfaces are respectively a first opposed wheel on a fixed axle and a second opposed wheel on a floating axle biased toward the fixed axle, wherein the floating axle has a first end and a second end, and wherein a nip is formed between the first and second opposed wheels;
a driver for at least one of the first and second opposed wheels, thereby activating at least one of the first and second opposed wheels and transporting the materials testing sample through the sample clearing device to a repository; and
a housing including an upper opening for receiving the testing sample, a lower opening through which the testing sample is ejected, and first and second side slots through which first and second ends of the floating axle extend.

9. The system of claim 8 wherein the the first end of the floating axle is biased by a first spring and the second end of the floating axle is biased by a second spring.

10. The system of claim 8 further including a positioning device for removing testing samples from the materials testing machine after a materials test and delivering the testing samples to the sample clearing device.

* * * * *